United States Patent [19]
Davis

[11] Patent Number: 5,970,147
[45] Date of Patent: Oct. 19, 1999

[54] SYSTEM AND METHOD FOR CONFIGURING AND REGISTERING A CRYPTOGRAPHIC DEVICE

[75] Inventor: Derek L. Davis, Phoenix, Ariz.

[73] Assignee: Intel Corporation, Santa Clara, Calif.

[21] Appl. No.: 08/938,491

[22] Filed: Sep. 30, 1997

[51] Int. Cl.⁶ ....................................... H04L 9/00
[52] U.S. Cl. .............................................. 380/25; 380/30
[58] Field of Search .................................. 380/4, 23, 25, 380/30

[56] References Cited

U.S. PATENT DOCUMENTS

| | | | |
|---|---|---|---|
| 5,539,828 | 7/1996 | Davis | 380/25 |
| 5,633,932 | 5/1997 | Davis | 380/25 |
| 5,664,017 | 9/1997 | Gessel et al. | 380/30 |
| 5,796,840 | 8/1998 | Davis | 380/25 |
| 5,799,086 | 8/1998 | Sudia | 380/23 |
| 5,805,706 | 9/1998 | Davis | 380/25 |
| 5,852,665 | 12/1998 | Gessel et al. | 380/30 |

*Primary Examiner*—Salvatore Cangialosi
*Attorney, Agent, or Firm*—Blakely, Sokoloff, Taylor & Zafman LLP

[57] ABSTRACT

A system and method for configuring and registering a cryptographic device. The configuration phase involves loading a device serial number (DSER) and a symmetric key (SK) into non-volatile memory of the cryptographic device. The non-volatile memory is integrated with processing logic of the cryptographic device. DSER is provided by an external source while SK is generated within the cryptographic device. The registration phase involves providing DSER to a database that contains cryptographic information associated with each cryptographic device manufactured. The cryptographic information includes at least a public key and a private key encrypted with SK. DSER is used to locate the appropriate cryptographic information and to transmit the cryptographic information to an electronic system having the cryptographic device.

18 Claims, 4 Drawing Sheets

SYSTEM AND METHOD FOR CONFIGURING AND REGISTERING A CRYPTOGRAPHIC DEVICE

BACKGROUND OF THE INVENTION

1. Field of the Invention

The present invention relates to the field of cryptography. More particularly, the present invention relates to a circuit and method for configuring and registering a cryptographic device.

2. Description of Art Related to the Invention

Currently, many individuals are using personal computers to store and to transmit sensitive information (e.g., confidential, proprietary, etc.) in a digital format. For example, credit card account information occasionally may be transmitted over the Internet to purchase good(s) and/or service(s). Likewise, bank account numbers and bank account balances are transmitted using on-line banking. Due to the sensitive nature of this information, measures have been taken to protect the "integrity" of the information outside the physical confines of the computer; namely, to guarantee that the information has not been altered without authorization. However, such measures fail to protect information within the computer.

As described in U.S. Pat. No. 5,539,828 assigned to Intel Corporation, Assignee of the present application, information may be protected within a computer by utilizing cryptographic hardware. The cryptographic hardware includes an integrated circuit (IC) package containing processing logic and dedicated, non-volatile (NV) memory in the IC package (referred to as "device NV memory"). Typically, the cryptographic hardware undergoes an exhaustive configuration phase at a manufacturing facility in which the device NV memory is configured to contain unique cryptographic information necessary for secure functionality of the cryptographic device such as, for example, a public/private key pair and a digital certificate.

Regardless of whether the cryptographic hardware involves a single-chip or even a multi-chip package implementation, a few disadvantages would be realized as cryptographic techniques become more advanced. One disadvantage is that larger, more costly packages will be required because larger amounts of device NV memory will be necessary in order to store greater amounts of cryptographic information. Hence, it would be cost efficient to substantially mitigate the amount of NV memory placed in the cryptographic device in favor of NV memory located elsewhere in the system which is referred to as "system NV memory" herein. Examples of system NV memory include hard disk, NV memory placed on a motherboard or daughter card, etc.

Currently, system NV memory has not been used. The reason is that a reliable, cost-effective technique has not been developed for ensuring that system NV memory, configured and programmed with cryptographic information unique to a certain cryptographic hardware, will be implemented within an electronic system having that cryptographic hardware.

It is contemplated that the key information may be programmed into the cryptographic hardware instead of producing at least a portion of the key information internally. However, such programming reduces the security of the system and may impose greater liability on the original equipment manufacturer of the electric system.

SUMMARY OF THE INVENTION

A method for configuring and/or registering a cryptographic device. With respect to one embodiment of the configuration scheme, a device serial number is loaded into a non-volatile memory of the cryptographic device. Internal to the cryptographic device, a key is generated and loaded into the non-volatile memory of the cryptographic device.

BRIEF DESCRIPTION OF THE DRAWINGS

The features and advantages of the present invention will become apparent from the following detailed description of the present invention in which.

DESCRIPTION OF THE PREFERRED EMBODIMENT

The present invention relates to a system and technique for configuring a cryptographic device to utilize non-resident, non-volatile (NV) memory and for registering the cryptographic device from a remote location. In the following description, some terminology is used in general to describe certain features of the present invention. For example, an "electronic system" is generally defined as any hardware product having information processing functionality such as, for example, a computer, a facsimile machine and a printer. "Information" is generally defined as one or more bits of data, address, and/or control information.

In addition, the following terminology is used to identify various types of cryptographic information. A "key" which is an encoding and/or decoding parameter used by conventional cryptographic functions such as a symmetric key cryptographic function (e.g., a Data Encryption Standard "DES" based function) or a public-key cryptographic function (e.g., a Rivest, Shamir and Adleman (RSA) based function). A "digital certificate" is generally defined as any information (e.g., a public key) used for user authentication. The information is encrypted with a private key (PRKCA) of a certification authority, namely any person or entity in a position of trust to guarantee or sponsor the digital certificate such as a bank, governmental entity, trade association, original equipment manufacturer, and the like.

Figure 1:
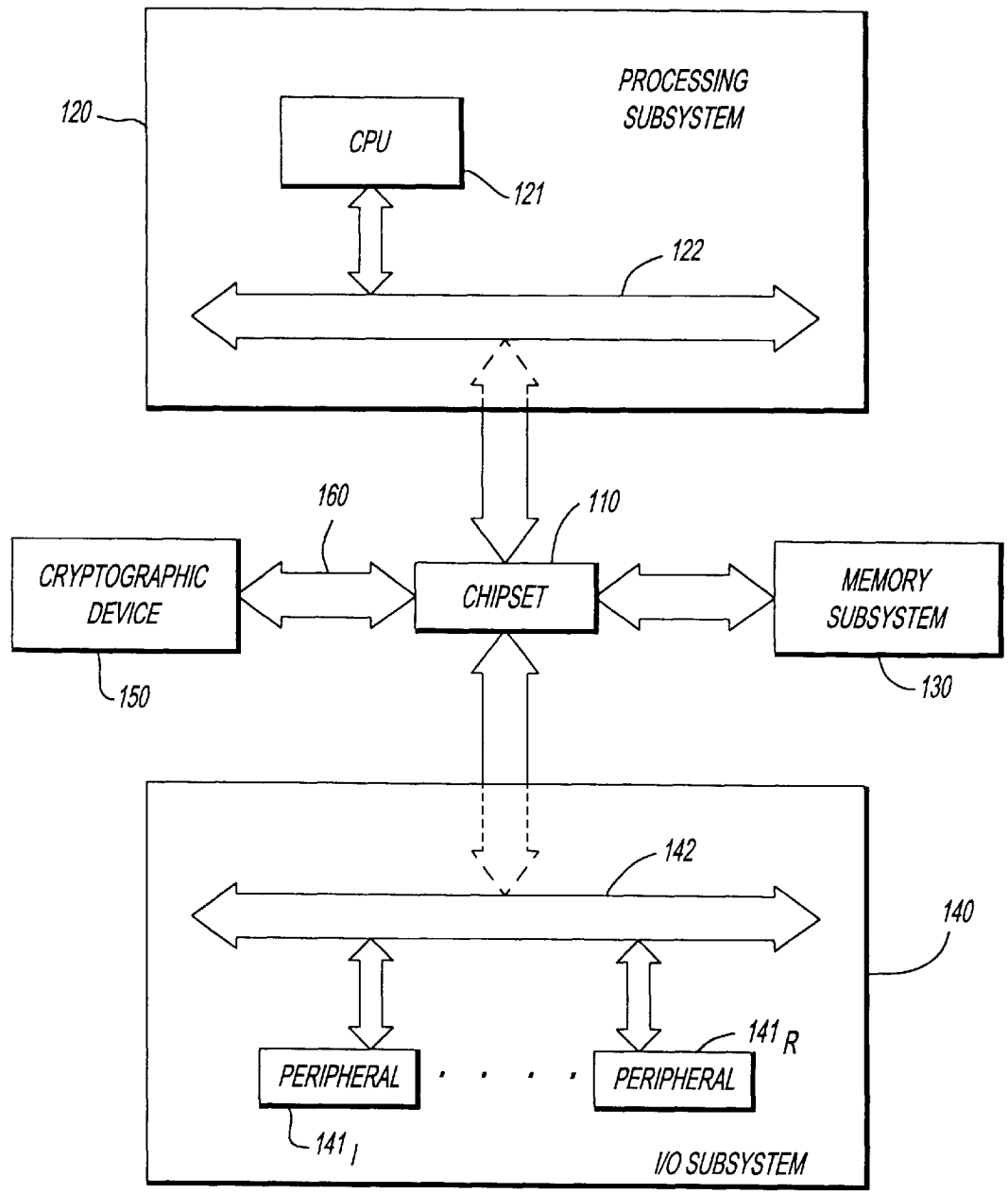
FIG. 1 is an illustrative block diagram of an electronic system including a multi-chip module employed as a bridge element.

Referring to FIG. 1, an illustrative embodiment of an electronic system 100 employing the present invention is shown. In this embodiment, the electronic system 100 comprises a chipset 110 interconnecting a number of subsystems. Examples of these subsystems may include, but are not limited or restricted to a processing subsystem 120, a memory subsystem 130, and an input/output (I/O) subsystem 140. Collectively, these subsystems 120, 130 and 140 control the functionality of electronic subsystem 100.

More specifically, as an illustrative embodiment, processing subsystem 120 includes at least one central processing unit (CPU) 121. CPU 121 is connected to chipset 110 via a host bus 122. The memory subsystem 130 usually includes one or more banks of volatile memory (not shown) such as any type of dynamic random access memory (DRAM), and/or static random access memory (SRAM). It is contemplated, however, that system NV memory may be used in memory subsystem 130 in lieu of or in addition to volatile memory.

Furthermore, I/O subsystem 140 includes "n" peripheral device(s) $141_1$–$141_n$ ("n" is a positive whole number) which are coupled to an I/O bus 142. Examples of a peripheral device include a mass storage device $141_1$ (e.g., a hard disk drive, a digital tape drive, a floppy disk drive, and a digital versatile disk "DVD" player).

To provide cryptographic functionality, a cryptographic device 150 may be connected to chipset 110 through a dedicated bus 160. Of course, as alternative system embodiments, cryptographic device 150 may be placed in communication with another bus in computer 100 such as host bus 122 or another processor-based bus like a backside bus (not shown), or perhaps I/O bus 142.

Figure 2:
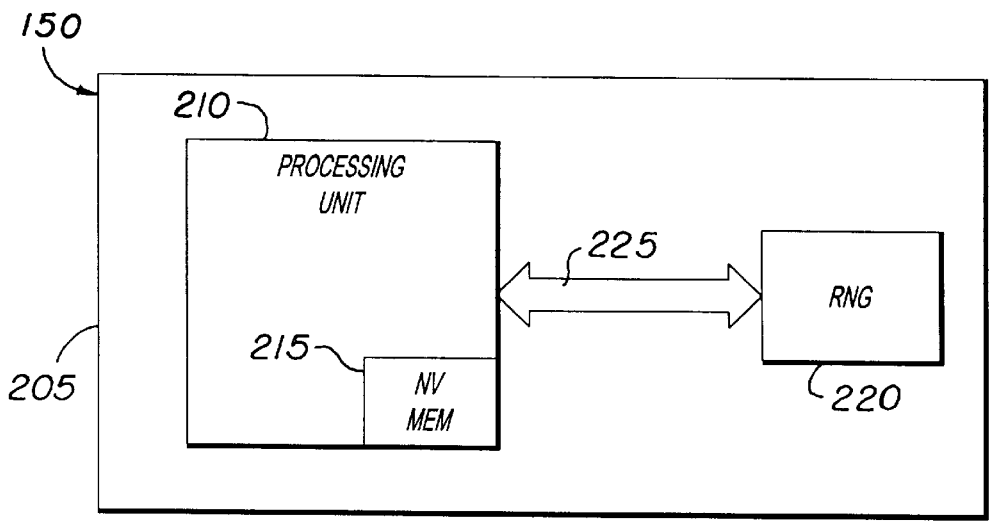
FIG. 2 is a block diagram of a preferred embodiment of the multi-chip module optimally shown as the bridge element of FIG. 1.

Referring to FIGS. 2, an illustrative embodiment of cryptographic device 150 of FIG. 1 is shown. Cryptographic device 150 includes an integrated circuit (IC) device 200 contained within a package 205 which protects IC device 200 from damage and harmful contaminants. IC device 200 comprises a processing unit 210 integrated with a small amount of device NV memory 215. Optionally, a random number generator 220 may be implemented within package 205 as a separate device connected to processing unit 210 through an internal bus 225 (as shown) or integrated within processing unit 210. Random number generator 220 is used to produce one or more keys when cryptographic device 150 is operating in a configuration mode.

Although the embodiment of the cryptographic device 150 shown in FIG. 2 may be implemented as a co-processor, it is contemplated that a variety of different embodiments could be selected. For example, cryptographic device 150 may be implemented within a disk controller, on a "smart" card (a form factor shaped like a credit card but having a micro-controller), or within a cartridge-like processor package including CPU 121 as described below in FIGS. 3–4. Other alternative embodiments may include incorporating the functionality of the cryptographic device into a chipset or within CPU 121 in which case, CPU 121 of processing subsystem 120 could be one and the same as processing unit 210.

Figure 3:
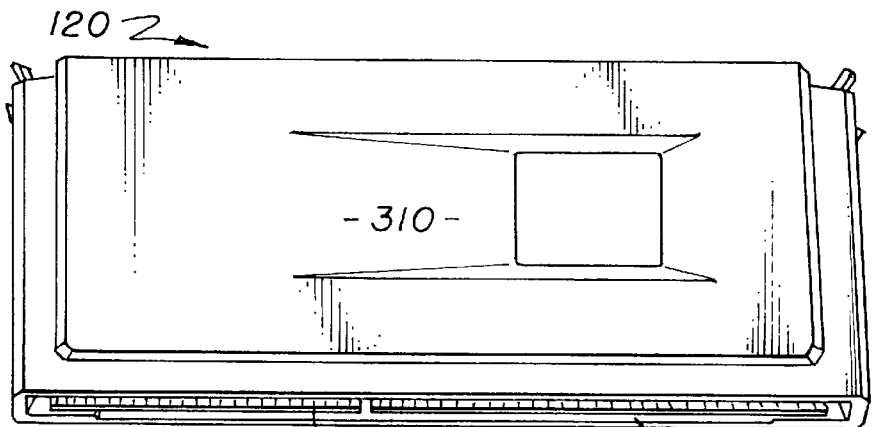
FIG. 3 is an illustrative embodiment of the processing subsystem of FIG. 1 including the cryptographic device.

Referring to FIG. 3, a perspective view of an alternative system embodiment, implementing cryptographic device 150 within a processing subsystem 120, is shown. IC components (including cryptographic device 150) are placed on a processor substrate 300 formed from any type of material upon which IC components (not shown) can be attached through well-known techniques (e.g., solder connection, etc.). The processor substrate 300 is substantially covered by a package 310 in order to protect the IC components from damage or harmful contaminants. Processor substrate 300 includes a connector 320, preferably adapted to establish a mechanical and electrical connection with a motherboard for example. As shown, connector 320 may include a standard male edge connector (as shown) or perhaps a female edge connector.

Figure 4:
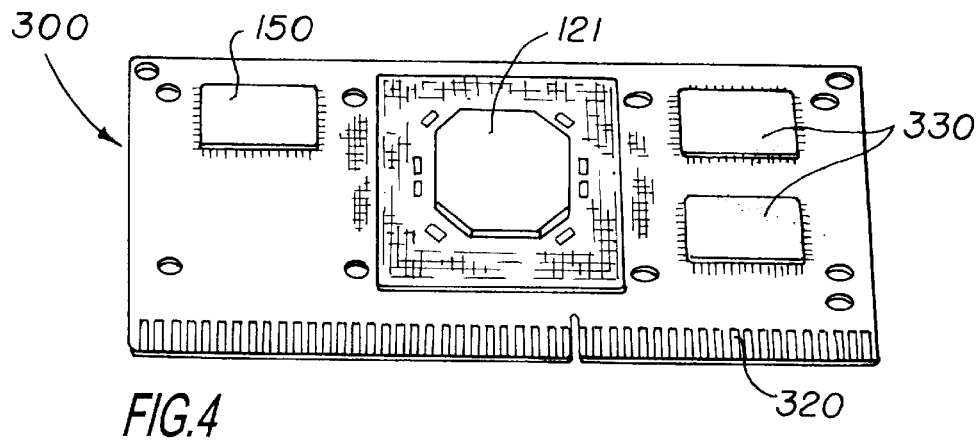
FIG. 4 is an illustrative embodiment of a substrate of FIG. 3.

As shown in FIG. 4, the IC components of processor substrate 300 include, but are not limited or restricted to CPU 121, memory 330 and cryptographic device 150. For communications with CPU 121, cryptographic device 150 may be placed on (i) a backside bus which is usually connected with memory 330, (ii) a front-side bus which is usually connected with external connector 320, or (iii) a dedicated internal bus. Of course, placement of this cryptographic device 150 is arbitrary so long as latency and other requisite conditions are maintained. Although not shown, discrete components (e.g., capacitors, oscillators, resistors, inductors, etc.) are attached to processor substrate 300 in a selected manner to, among other things, maximize routability and decrease length of communication lines between these IC components.

Figure 5:
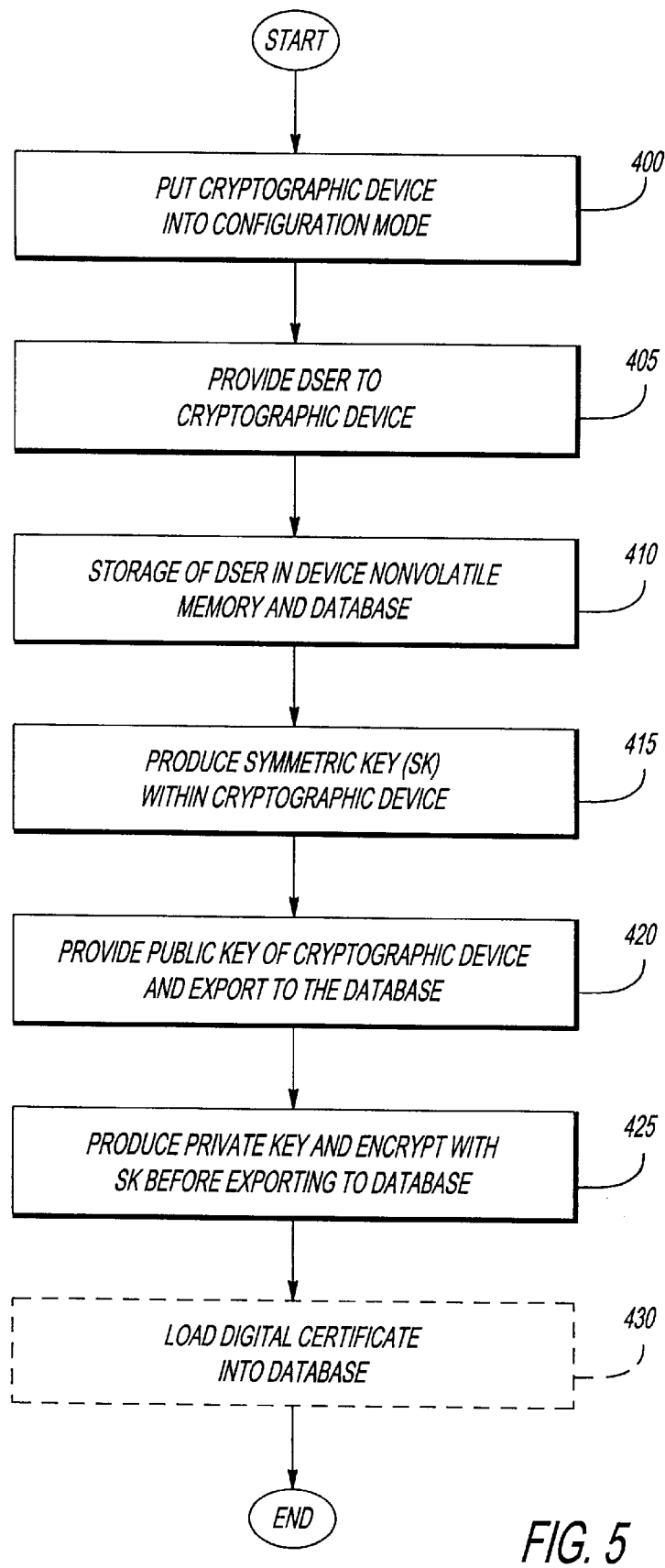
FIG. 5 is an illustrative flowchart of the configuration scheme performed by the cryptographic device of FIG. 2.

Referring now to FIG. 5, a preferred embodiment of a configuration scheme utilized by the cryptographic device is shown. At manufacture, the cryptographic device undergoes a configuration phase in order to load only a limited amount of cryptographic information into its integrated device NV memory. One embodiment for the configuration phase involves the use of a certification system including (i) a programming mechanism having a device carrier sized to accommodate the cryptographic device, and (ii) a database (e.g., a server, personal computer, mainframe, etc.) which receives cryptographic information from the programming mechanism. To avoid obscuring the present invention, only the function operations of the programming mechanism will be described.

When turned-on, the programming mechanism initially supplies power and provides predetermined control information into appropriate leads of the cryptographic device via the device carrier. This control information places the cryptographic device into a configuration mode (Step 400). After being placed in the configuration mode, the cryptographic device initially receives a unique device serial number (DSER) from the programming mechanism (Step 405). Normally sized with a sufficient number of bits to avoid duplication (e.g., 32 or 64 bits), DSER is stored in the integrated device NV memory of the cryptographic device and is provided to the database (Step 410). DSER is used by the database as an index for a table of pointers. Each pointer is responsible for addressing one or more locations in memory which contain cryptographic information uniquely associated with the cryptographic device identified by its DSER.

Additionally, by supplying power to the cryptographic device, the random number generator is powered to produce random numbers used in generating a unique symmetric key (SK) and a public/private key pair (Step 415). The public key (PUK) is exported to the database without undergoing any modification (Step 420). However, the private key (PRK) is encrypted using an encryption algorithm (e.g., DES pre-loaded in memory of the cryptographic device), and thereafter, exported to the database (Step 425). More specifically, PRK is encrypted with SK (producing $E_{sk}$ (PRK)) before being exported to the database. As a result, the cryptographic device contains a minimal amount of cryptographic information, namely SK and DSER, while an indexed location of database includes the majority of the cryptographic information.

Optionally, as represented by dashed lines, it is contemplated that a digital certificate associated with PUK and DSER may be loaded into the database at a later time, potentially even after the cryptographic device has been sent to an original equipment manufacturer (OEM) for placement in the electronic system (Step 430). The digital certificate includes at least PUK encrypted with a private key of the manufacturer in this embodiment, which could be used for subsequent authentication of the cryptographic device. It is contemplated, however, that DSER may be included in the digital certificate.

After the cryptographic device has been installed into the electronic system having sufficient system NV memory, communications may be established to the database of the manufacturer for registration purposes. This registration scheme does not require a secure communication channel because PRK has been encrypted. Registration may be performed by any downstream customer, including an OEM before shipment of the electronic system to the end user, or the end user. For the later case, the electronic system may be loaded with system software having a registration subroutine. During initialization of the electronic system by system software, the registration subroutine would assist in establishing communications with the database in order to retrieve and download cryptographic information unique to the electronic system. This registration scheme may be transparent to the end user or may require active participation by the end user in agreeing to certain terms and conditions (e.g., releasing the manufacturer from liability, etc.).

Figure 6:
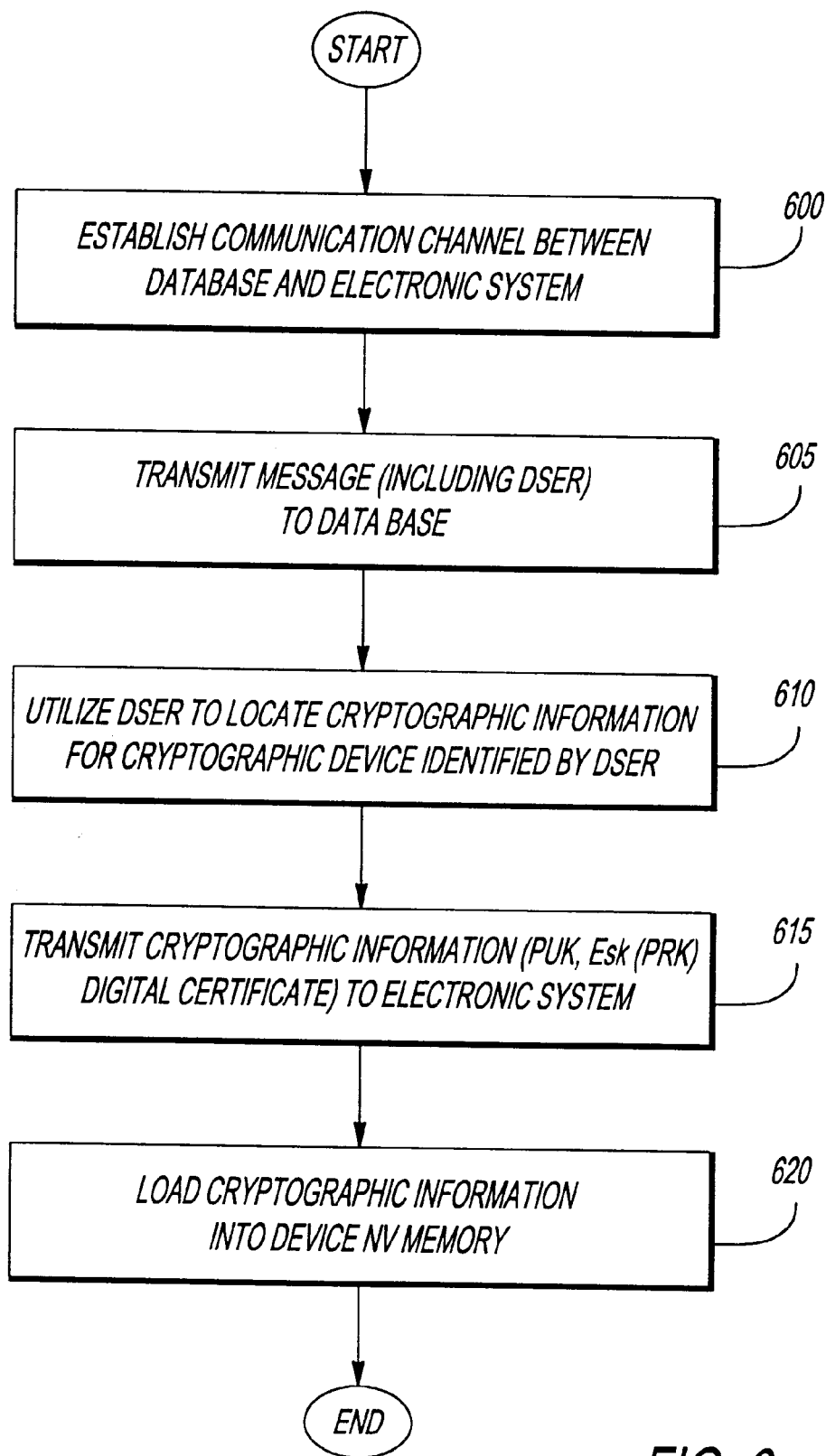
FIG. 6 is an illustrative flowchart of the registration scheme performed by the cryptographic device of FIG. 2.

Referring now to FIG. 6, an illustrative embodiment of the registration scheme between the database of the manufacturer and the downstream customer (OEM, end user, etc.) is shown. First, a communication channel has to be established between the database and the electronic system implemented with the cryptographic device (Step 600). This may be accomplished over the Internet, through a dedicated phone line or over any other communication link. Next, the electronic system transmits a message, including DSER obtained from its cryptographic device, to the database over the communication channel (Step 605). The database receives the message and utilizes DSER as an index in searching for cryptographic information associated with the cryptographic device identified by DSER (Step 610). This cryptographic information (PUK, $E_{sk}$(PRK), and digital certificate) is transmitted over the communication channel to the electronic system and loaded into system NV memory of the electronic system (Steps 615–620). Thus, the cryptographic device now is fully functional to support public-key cryptography because it has access to its PUK and PRK because $E_{sk}$(PRK) can be decrypted with SK already integrated in its device NV memory.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for configuring a cryptographic device comprising:

loading a device serial number into a non-volatile memory of the cryptographic device;

producing a key within the cryptographic device the key being stored in the non-volatile memory;

producing a cryptographic key pair within the cryptographic device the cryptographic key pair including a public key and a private key;

encrypting the private key with the key; and exporting the device serial number, the public key and the private key encrypted with the key to a database remotely located from the cryptographic device without storage of the public key and the private key internally within the cryptographic device.

2. The method of claim 1 further comprising:

discontinuing any further loading of information within the non-volatile memory of the cryptographic device after the device serial number and the key have been loaded.

3. The method of claim 1 further comprising:

providing the public key to a certification authority;

encrypting the public key with a private key of the certification authority to produce a digital certificate; and sending the digital certificate to the database to accompany the public key and the encrypted private key.

4. The method of claim 1, wherein the device serial number is unique and distinct from device serial numbers for other cryptographic devices.

5. The method of claim 1, wherein the key is a symmetric key.

6. The method of claim 5, wherein the symmetric key is unique and distinct from other symmetric keys associated with the other cryptographic devices.

7. The method of claim 1, wherein the non-volatile memory is integrated within processing logic of the cryptographic device.

8. A method for registering a cryptographic device comprising:

establishing a communication channel between a database and an electronic system implemented with the cryptographic device, the cryptographic device including non-volatile memory storing a key and a device serial number;

transmitting a message to the database, the message including the device serial number contained in the cryptographic device; and receiving a public key and a private key encrypted with the key associated with the cryptographic device, the public key and the private key having been originally generated internally within the cryptographic device but now stored within the database in lieu of the cryptographic device itself.

9. The method of claim 8 further comprising:

loading the public key and the private key encrypted with the key into a non-volatile memory element of the electronic system.

10. The method of claim 8, wherein the communication channel is not secure.

11. The method of claim 8, wherein the key is a symmetric key.

12. The method of claim 8, wherein prior to receiving the public key, the method further comprising:

receiving the message including the device serial number by the database;

using the device serial number as a lookup index; and transmitting the public key and the private key encrypted with the key to the electronic system.

13. The method of claim 8 further comprising:

receiving a digital certificate being the public key encrypted with a private key of a certification authority.

14. A system comprising:

a chipset;

a non-volatile memory element coupled to the chipset;

a cryptographic device coupled to the chipset, the cryptographic device including processing logic having a small amount of device non-volatile memory, the non-volatile memory containing a device serial number and a key; and a transceiver to download a public key of the system and a corresponding private key encrypted with the key into the non-volatile memory during registration, the public and private keys having been originally generated internally within the cryptographic device during a prior configuration stage for exclusive storage outside the cryptoraphic device prior to registration.

15. A cryptographic device comprising:

a random number generator to generate at least one random number to produce a symmetric key, a public key and a private key associated with the cryptographic device;

a non-volatile memory including the symmetric key; and a processing unit coupled to the random number generator and the non-volatile memory, the processing unit to control (i) loading of the key into the non-volatile memory, (ii) encrypting of the private key with the symmetric key, and (iii) outputting of the public key and the encrypted private key without storage of the public key and the private key within the cryptographic device during configuration of the cryptographic device.

16. The cryptographic device of claim 15, wherein the processing unit controls subsequent retrieval of the public key and the encrypted private key after outputting the public key and the encrypted private key during a registration phase.

17. The cryptographic device of claim 16, wherein the processing unit controlling access to a remote database for retrieval of the public key and the encrypted private key.

18. The cryptographic device of claim 15, wherein the processing unit is a general purpose microprocessor.

* * * * *